United States Patent Office 2,953,688
Patented Sept. 20, 1960

2,953,688

RADIANT ENERGY DETECTOR AND MAGNETIC SPACE FILTER FOR USE THEREIN

Richard F. Maxwell, Jr., Baltimore, and Richard F. Higby, Severna Park, Md., assignors to Westinghouse Electric Corporation, East Pittsburgh, Pa., a corporation of Pennsylvania Filed June 6, 1957, Ser. No. 664,066

14 Claims. (Cl. 250—83.3)

This invention relates to radiant energy detectors, and more particularly to a radiant energy detector employing a magnetic space filter.

Prior art radiant energy detectors and particularly detectors of infrared energy are characterized by inefficiency as a result of techniques employed to pick out a specific source of radiation in the field of view of the detector and observe or detect its characteristics separate from the influence of the total radiation in the field of view. An example is a photodetector employed to detect a jet aircraft in a bright daylight sky, with the intention of providing an alarm whenever the jet aircraft flies through the field of view of the detector apparatus. As is well known in the art, a jet engine radiates more infrared power per unit area than the sky, with the exception of intensely bright sun reflections, and when the jet engine enters the photodetector's field of view, the total energy received increases by some increment. The indicating system or apparatus must be sensitive enough to measure the corresponding change in the electrical characteristics of the photodetector due to the incremental increase in radiant energy in the field of view. It is usually necessary that the target radiation be comparable to the ambient or background radiation, thus limiting the detection system to small fields of view, short ranges or to use when the general sky illumination is very low.

One prior art device inserts in or near the detector cell image plane a checker-board reticle of transparent and opaque pie-shaped sections. This reticle is rotated, and a target appearing as a spot in the image plane is chopped, i.e., the radiant energy from the target falls on the detector cell intermittently. The background radiation which is more or less uniform in distribution does not experience the chopping as it is spread out over the image plane, and the amount falling on the cell is substantially constant as the reticle revolves. Accordingly, the alternating current signal derived from the detector cell is that of the target, while the direct current signal is that of the background, and such an arrangement provides increased sensitivity of target detection.

The above-described prior art arrangement has the disadvantage, however, that the spinning reticle interrupts radiation arriving from the target with the result that only half of the available power in radiant energy received from the target is utilized. The reticle type output signal, due to the aforementioned chopping, usually has a peak-to-peak value proportional to the difference between the target intensity and the average ambient or background radiation intensity.

The aforementioned conventional or prior art radiation detectors are also subject to saturation and loss of sensitivity when the ambient or background radiation level is too high, and this last-named disadvantage is not relieved by the use of a spinning reticle as aforedescribed.

The apparatus of the instant invention overcomes these and other disadvantages of the prior art by employing a magnetic space filter, employing a number of similar detector elements formed into a stationary reticle or multiple-cell. Each of the detector elements is preferably composed of a semiconductor filament. As is well known in the art, the photons in radiant energy impinging upon a semiconductor filament impart their energy to valence electrons in the semiconductor causing them to break their valence bonds and thus provide electron-hole pairs of current carriers. These carriers normally diffuse downward in the material, but in the presence of a magnetic field of constant polarity and preselected direction are deflected, the holes in one direction and the electrons in the opposite direction. The direction of the current flow depends upon the polarity of the magnetic field applied to the detector element. This effect is classically known as the PEM effect, or photo-electric-magnetic effect.

In the instant invention, as aforementioned, a large number of these sensitive elements are disposed closely adjacent to each other in the form of a stationary reticle or multiple-cell and electrically connected so that alternate detector elements supply output voltages which are in polarity opposition to each other. As a result, a target having dimensions sufficiently small so that the radiation from the target illuminates only one detector element results in the production of a potential across the space filter or reticle, whereas large sources of radiant energy which illuminate all or a large number of the elements with equal intensities have their electrical effects cancelled out in the output signal of the device. Indicating means operatively connected to the plurality of detector elements is provided for giving an indication of the presence of a target in the field of view of the apparatus.

Accordingly, a primary object of the invention is to provide new and improved radiant energy detector apparatus.

Another object is to provide new and improved radiant energy detector apparatus having a magnetic space filter.

Still another object is to provide new and improved radiant energy detector apparatus in which full utilization of the received energy is provided for.

A further object is to provide a new and improved radiant energy detector of the magnetic space filter variety having a peak-to-peak signal output that is proportional to twice the intensity of the radiation arriving from the desired target or other source.

A further object is to provide a new and improved radiation detector in which the possibility of detector cell saturation by high ambient or background radiation is reduced.

Other objects and advantages will become apparent after a perusal of the following specification when studied in connection with the accompanying drawings, in which.

Figure 1:
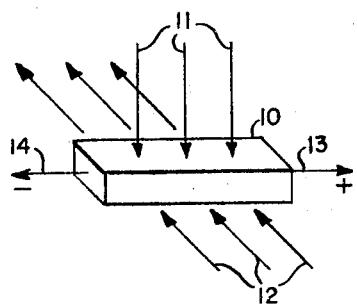
Figure 1 is a perspective view of a single detector element showing the directions of radiant energy, magnetic field, and current flow along, for example, three axes of the detector element.

Particular reference should be made now to the drawings for a more complete understanding of the invention, in which like reference numerals are used throughout to designate like parts, and in particular to Fig. 1 thereof. The reference numeral 10 indicates a detector element which may be composed of a suitable semiconductor material such, for example, as indium antimonide. Arrows 11 indicate the direction of propagation of radiant energy, arrows 12 indicate the direction or polarity of a magnetic field or flux, arrow 13 indicates the direction of movements of the holes in the semiconductor 10, and arrow 14 indicates the direction of movement of the electrons in the semiconductor 10.

Figure 2:
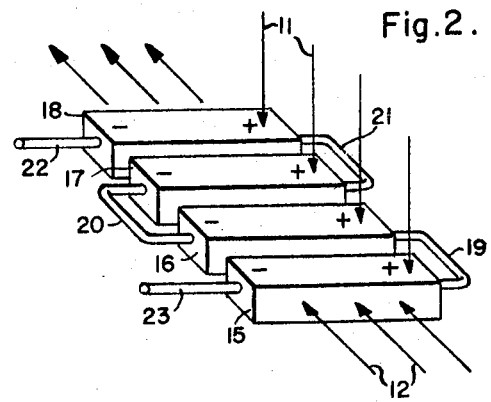
Fig. 2 is a perspective view of a number of the sensitive elements grouped together to form a multiple cell and connected in an electrical circuit in alternate polarity opposition.

Particular reference should be made now to Fig. 2 in which a magnetic space filter composed of four detector elements 15, 16, 17 and 18 is shown, elements 15 and 16 being interconnected by a shorting bar or lead 19, elements 16 and 17 being interconnected by a shorting bar or lead 20, and elements 17 and 18 being interconnected by a shorting bar or lead 21, the output of the magnetic space filter being delivered to output leads 22 and 23. In accordance with the direction or polarity of the magnetic field 12 and the direction from which radiant energy impinges on the elements, the polarity of the detector elements and the direction of the current flow therein is indicated by the positive and negative signs on each of the elements 15, 16, 17 and 18. It will be noted that elements 15 and 16 are connected in polarity opposition as are elements 16 and 17 and elements 17 and 18. Radiant energy reaching all of the four elements 15, 16, 17 and 18 in equal intensity will result in voltages which substantially completely cancel out each other with the result that the useful output voltage on the aforementioned leads 22 and 23 will be inconsequential; however, if one of the detector elements is illuminated with a greater intensity of illumination such, for example, as that provided by a target jet aircraft, then a target signal will be developed across leads 22 and 23.

Figure 3:
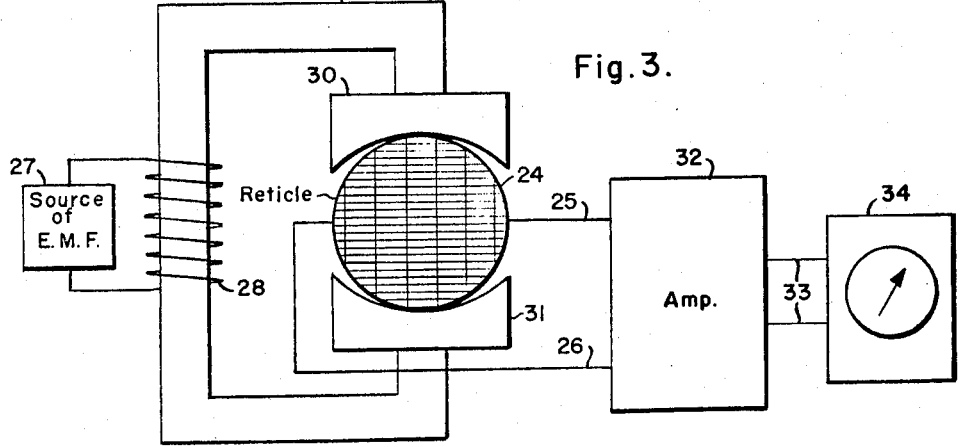
Fig. 3 is an electrical circuit diagram showing a space filter or reticle of detector elements and indicating apparatus connected thereto.

Particular reference should be made now to Fig. 3. A large reticle or space filter composed of preferably an even number of preferably substantially identical detector elements and similar to those of Figs. 1 and 2 is shown and designated by the reference numeral 24, having output leads 25 and 26. It should be understood that all of the elements in the reticle or multiple-cell 24 are connected in a manner similar to that illustrated in Fig. 2. It should be understood that any suitable optical means, not shown in Fig. 3, may be employed for focussing infrared radiation onto reticle 24 and providing a preselected field of view for the detector apparatus. Means is provided in Fig. 3 for subjecting the elements of the reticle 24 to a steady or pulsed magnetic field, and to this end a source of direct current potential or pulse source 27 energizes a coil 28 which sets up a magnetic field in a suitable magnetic circuit forming device 29 having pole pieces 30 and 31 adjacent the aforementioned reticle 24. Preferably, the shape of the pole pieces 30 and 31 and their thickness and material is such that all of the detector elements in the reticle or multiple-cell 24 are subjected to a magnetic field of substantially equal intensity or magnitude. The output of the space filter or reticle 24, as aforementioned, is developed across leads 25 and 26 which may be applied to an amplifier 32 of conventional design, the output of which is applied by way of leads 33 to a suitable indicating device 34 which may be a voltmeter, for example.

In the operation of the apparatus of Fig. 3, let it be assumed by way of example, that the reticle or multiple-cell 24 is illuminated by background or ambient radiation of a character such that substantially all of the detector elements have the same intensity of illumination applied thereto. Assume further for purposes of description that source 27 is supplying a direct current so that the magnetic field applied to the detector elements of reticle 24 is substantially constant in strength and polarity. The indication on indicator 34 will approach zero, and may be made to equal zero if desired by suitable zeroing means, not shown, the small direct current voltage which may be developed across the leads 25 and 26 by slight variations in the ambient radiation having no useful significance. Assume now by way of description, that a target moves into the field of view of the detector apparatus and illuminates one sensitive element or detector cell of the multiple-cell or reticle 24 of Fig. 3. The output voltage or target signal across leads 25 and 26 will increase, providing an increased output indication in indicator 34, which thereby indicates the presence of a target in the field of view of the detector apparatus.

Assume now by way of description that source 27 provides a pulsed output. Amplifier 32 may in this case be suitable for amplifying pulsed signals, and a target illuminating one detector element more strongly than the other detector elements will, as before, provide a target output signal on leads 25 and 26 which distinguishes by its increased amplitude over ambient or background radiation reaching the reticle 24. By suitable arrangement, the reticle or multiple-cell output on leads 25—26 may be made proportional to twice the target radiation intensity.

Figure 4:
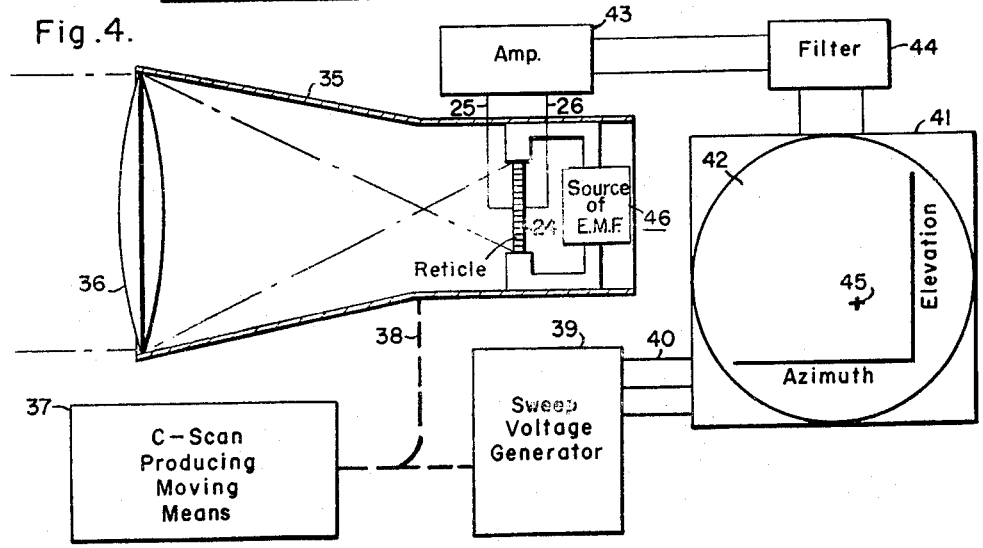
Fig. 4 is a view of a modification of the invention of Fig. 3 and employing scanning apparatus and a cathode ray tube display device.

Particular reference should be made now to Fig. 4 in which there is shown the preferred embodiment of the invention having scanning apparatus and cathode ray tube indicator means for providing a suitable indication. The aforementioned reticle 24 is mounted in a housing device or casing 35 for providing a predetermined small field of view and having lens means 36 for focussing infrared energy onto the reticle 24. It should be understood that a source means for an electromotive force or current designated 46 in Fig. 4 is provided for subjecting the reticle or multiple-cell 24 of Fig. 4 to any desired type of magnetic field. Means for moving the housing or casing means 35 in a suitable scanning pattern, for example, means for moving the mounting or housing means 35 in a series of substantially horizontal lines differing in elevation from each other to provide a C-type of scan, is shown in block form and generally designated 37, the moving means 37 being operatively connected by means 38 to the mounting means 35 for moving the same, the moving means 37 also being operatively connected by coupling 38 to a sweep voltage generator shown in block form and generally designated 39, the sweep voltage generator 39 being connected by lead means 40 to a suitable cathode ray tube display device 41 having a screen 42 calibrated in azimuth and elevation, as shown.

The output of the aforementioned reticle or multiple-cell 24 is applied by lead means 25 and 26 to an amplifier 43, the output of which is applied by way of filter 44 to the aforementioned cathode ray tube display device 41. The indicator device 41 employs a cathode ray tube having means, not shown, for intensity modulating the beam thereof, in a manner which will be readily understood by those skilled in the art. The output of the filter 44, which may be constructed and arranged to filter out signals or voltages at the scanning frequency, is delivered to indicator 41 and employed to intensity modulate the beam in the display device 41, as aforementioned.

Figure 5:
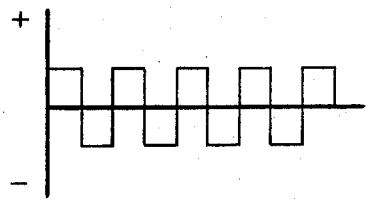
Fig. 5 is a graph illustrating the operation of the apparatus of Fig. 3 under certain conditions.

Particular reference should be made now to Fig. 5 which is a graph illustrating the voltage across leads 25 and 26 of Fig. 4 under certain conditions of operation. As the device having housing 35 is moved in a scanning motion, the background or ambient radiation reaching reticle 24 may change to some small extent, and the signal resulting from this change may be filtered out at filter 44. Assume now by way of description that the magnetic field on reticle 24 is a field of substantially constant magnitude and polarity, and that the field of view of apparatus or housing 35 is scanned across a portion of sky having therein a target representing a small source of infrared energy of considerably greater amplitude or intensity than the background or ambient radiation. As the image of the target source cuts across the elements of the reticle 24, an output voltage, for example, similar to that of the curve of Fig. 5 may be obtained, which reverses in polarity as the spot representing the target moves from element to element, and this output voltage as amplified at 43 intensity modulates by any convenient means, not shown, the beam of the cathode ray display device 41 thereby providing a luminous spot 45 having a position on the screen 42 which corresponds to the location of the target in azimuth and elevation.

Figure 6:
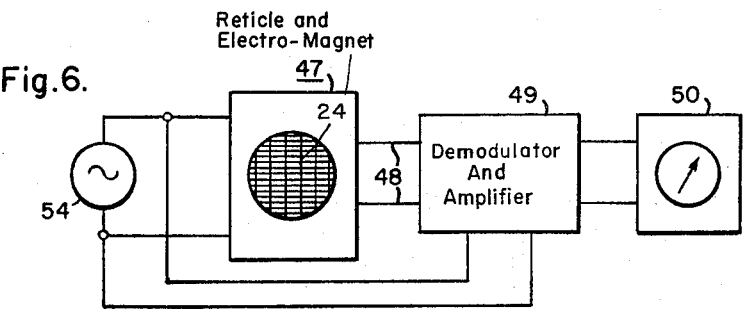
Fig. 6 is a schematic electrical circuit diagram in block form, of an additional embodiment of the apparatus employing an alternating magnetic field in connection with the detector elements.

Particular reference should be made now to Fig. 6, in which there is shown in block form, an embodiment or arrangement in which a magnetic field of alternating polarity is employed across the reticle of sensitive detector elements 24, alternate elements in the rows and alternate elements in the files being connected in polarity opposition. Means for generating an alternating current 54 is connected to a magnetic space filter device generally designated 47 which it is understood includes a reticle or multiple-cell 24 and means for utilizing the alternating current from generator 54 to set up a magnetic field having an alternating polarity, the output of the device 47 being applied by way of leads 48 to a demodulator and amplifier shown in block form and generally designated 49. The frequency of the alternating current voltage from source 54 may be expected to be at least several times the frequency or period at which a target image moves from one element to an adjacent element of opposite polarity as the reticle 24 is subjected to a searching or scanning movement. The output of the space filter 47, as will be readily understood by those skilled in the art, will be an alternating current signal of the frequency of source 54 modulated in amplitude at a frequency determined by the rate of movement of the target image across the elements. Demodulator 49 may in a conventional manner utilize the voltage from source 54 to obtain an output corresponding only to the useful signal component resulting from movement of the target image across the sensitive elements. The output of the amplifier and demodulator 49 is applied to a suitable voltage indicating device 50, which may be of any convenient design.

Figure 7:
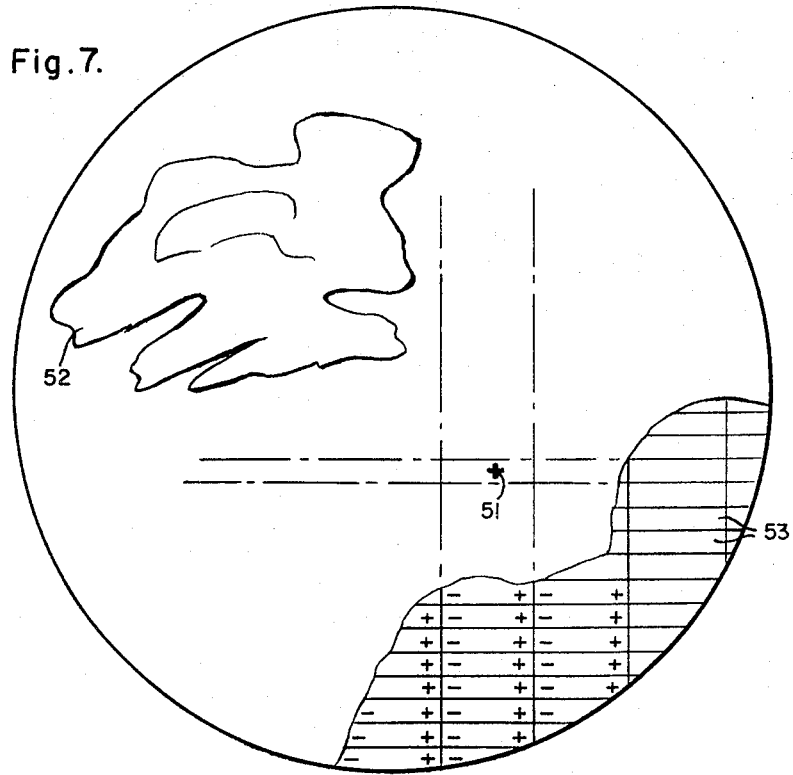
Fig. 7 illustrates a typical field of view of the detector apparatus.

Particular reference should be made now to Fig. 7, which indicates or shows a typical field of view of the radiant energy detector apparatus. The image of a target source, for example, a jet aircraft, is indicated at 51, whereas the image of a cloud is indicated at 52. It will be noted that the cloud covers a large number of detector elements 53 of the reticle or multiple-cell with the result that the effects of the cloud 52 are minimized in the output voltage of the reticle of detector elements, as hereinbefore explained in greater detail. If desired, adjacent rows and files of sensitive elements may be so electrically connected that a target moving vertically or horizontally in the field of view provides an output signal which periodically reverses in polarity as the target moves from element to element.

Whereas the invention has been shown and described with reference to multiple-cell or reticles in which alternate sensitive elements are connected in polarity opposition, it should be understood that other connecting arrangements could be employed; for example, a first pair of adjacent elements could be connected in series adding with each other and a second pair of elements connected in series adding with each other but in polarity opposition to the first pair, etc.

Any convenient means, not shown, may be employed for holding or supporting the plurality of sensitive elements in positions to form a reticle or multiple-cell.

Whereas the invention has been shown and described with reference to semiconductor radiation detector elements, it should be understood that the principles of the invention as taught herein are applicable to photocells, photoconductors, thermopiles, bolometers, photovolatic devices, etc. Reticle 24 of Fig. 3 might be, for example, a group of closely spaced photocells.

The sensitive semiconductor elements of the multiple-cell 24 may have any suitable dimensions; for example, elements 1/32 inch in cross-section and 1/2 inch long may be employed.

Whereas the invention has been shown and described with respect to some embodiments thereof which give satisfactory results, it should be understood that changes may be made and equivalents substituted without departing from the spirit and scope of the invention.

We claim as our invention:

1. Radiant energy detector apparatus comprising, in combination, means forming a plurality of radiation sensitive elements, each of said elements being composed of a semiconductor material, means for setting up a magnetic field and applying the magnetic field to each of the elements whereby each of said elements generates an electrical signal of predetermined polarity having an amplitude which varies in accordance with variations in the intensity of radiant energy in a predetermined portion of the spectrum impinging on the element, electrical circuit means connecting some of said sensitive elements in series in polarity opposition with other of said sensitive elements, and signal indicator means connected to said circuit means for providing a signal indication while one of said sensitive elements is illuminated by radiant energy in said spectrum portion of greater intensity than other of said sensitive elements.

2. Radiant energy detector apparatus comprising, in combination, a plurality of radiation sensitive elements, means disposed in predetermined position with respect to said plurality of radiation sensitive elements for applying a pulsed magnetic field of uniform polarity to each of said elements, each of said radiation sensitive elements being composed of a semiconductor material and having a current flow therein substantially along a predetermined axis thereof while the element has radiant energy in a predetermined portion of the spectrum impinging thereon along another axis thereof at right angles to said predetermined axis and while the magnetic field is applied to the element along a third axis thereof at right angles to both of said other axes, said current flow having a polarity in accordance with the direction of the magnetic field, electrical connecting means connecting said plurality of radiation sensitive elements in series in predetermined polarity relationships with respect to each other, and indicating means operatively connected to said connecting means, said plurality of elements providing a useful output signal to said indicating means while one of said elements is receiving more radiant energy in said spectrum portion than the remainder of said plurality of elements.

3. Radiant energy detector apparatus comprising, in combination, a plurality of radiation sensitive elements each composed of a semiconductor material, means disposed in predetermined position with respect to said plurality of elements for subjecting each of said plurality of elements to a periodically varying magnetic field, each of said elements generating a signal in accordance with the strength of the radiation in a predetermined portion of the spectrum impinging thereon and having a polarity in accordance with the instant direction of said magnetic field, electrical circuit means connecting alternate elements in polarity opposition, and signal indicating means operatively connected to said electrical circuit means.

4. Radiation detector apparatus comprising, in combination, a plurality of radiation sensitive elements, each composed of a semiconductor material; means for subjecting said plurality of sensitive elements to a periodically varying magnetic field of preselected characteristics, each of said sensitive elements while radiant energy in the infrared portion of the spectrum is impinging thereon and while the magnetic field is applied thereto producing an electrical signal which varies in magnitude with variations in the intensity of the infrared radiant energy impinging thereon and having a polarity in accordance with the instant polarity of the magnetic field applied thereto, electrical circuit means interconnecting the sensitive elements and connecting some of the sensitive elements in series in polarity opposition with other of the sensitive elements, and indicator means operatively connected to said circuit means, said indicator means being constructed and arranged to provide an indication while at least one of said sensitive elements is illuminated by infrared radiant energy of greater intensity than the remainder of said sensitive elements.

5. Radiation detector apparatus comprising, in combination; a multiple-cell including a plurality of radiation sensitive elements each composed of a semiconductor material; means for applying a steady magnetic field to said multiple-cell, each of said sensitive elements while radiant energy in the infrared portion of the spectrum is impinging thereon and while the magnetic field is applied to the multiple-cell producing an electrical signal which varies in magnitude with variations in the intensity of the infrared radiant energy impinging thereon and having a polarity in accordance with the instant polarity of the magnetic field; means mounting said plurality of radiation sensitive elements in predetermined positions with respect to each other and providing a preselected detector field of view; and electrical circuit means including means connecting some of the sensitive elements in series in polarity opposition with other of the sensitive elements, said circuit means including signal indicator means.

6. Radiation detector apparatus comprising, in combination, a plurality of radiation sensitive elements each composed of a semiconductor material, said plurality of radiation sensitive elements being disposed in predetermined positions with respect to each other, means disposed in predetermined position with respect to said plurality of sensitive elements for producing a magnetic field and applying the field to at least some of said elements, pulsing means operatively connected to said magnetic field producing means for generating a pulsed magnetic field, each of said elements while radiant energy in the infrared portion of the spectrum from a distant source is impinging thereon and while the magnetic field is applied thereto producing an electrical signal which varies in magnitude with variations in the intensity of the infrared radiant energy impinging thereon and having a polarity in accordance with the polarity of the magnetic field applied thereto, electrical circuit means connecting some of the sensitive elements in series in polarity opposition with other of the sensitive elements, and indicating means electrically connected to said electrical circuit means for providing a signal indication while one of said sensitive elements is illuminated by infrared radiant energy of greater intensity than the remainder of said sensitive elements.

7. Radiant energy detector apparatus comprising, in combination, radiant energy sensitive means including a plurality of semiconductor elements disposed in predetermined positions with respect to each other to form a multiple-cell reticle, magnetic field producing means for applying a magnetic field to said reticle, the semiconductor elements of said multiple-cell reticle utilizing the photo-electric-magnetic effect to provide a signal output while the cell has a relatively small area thereof illuminated by energy in a preselected portion of the spectrum arriving from a distant source in greater intensity than a relatively large area thereof, movable housing means for mounting said magnetic field producing means and said reticle and providing a predetermined detector field of view, moving means operatively connected to the housing means for moving the housing means in a preselected pattern of movement to thereby provide a scanning movement for said field of view, and cathode ray tube indicator means electrically connected to said multiple-cell reticle to receive the signal output therefrom, said indicator means being operatively connected to said moving means and providing an indication of the location of a small source of radiant energy in said portion of the spectrum of greater intensity than the ambient background intensity in said field of view.

8. Radiation detector apparatus comprising, in combination, radiant energy sensitive means including a plurality of semiconductor elements, means for applying a magnetic field to said plurality of semiconductor elements; mounting means including a housing mounting said plurality of semiconductor elements in predetermined positions with respect to each other, said mounting means being movable and including optical means for focussing radiant energy from the fields of view of the optical means onto said plurality of semiconductor elements, each of said semiconductor elements while radiant energy in a predetermined portion of the spectrum is impinging thereon and while the magnetic field is applied thereto producing an electrical signal which varies in magnitude with variations in the intensity of the radiant energy in said spectrum portion impinging thereon and having a polarity in accordance with the polarity of the magnetic field; means for moving said mounting means in a predetermined pattern of movement to thereby sweep said field of view in a path corresponding to said predetermined pattern of movement, and indicator means including electrical circuit means connecting some of the semiconductor elements in series in polarity opposition with other of the semiconductor elements, said indicator means providing a signal indication while said field view is directed at a source of radiant energy of a size such that one of said semiconductor elements is more intensely illuminated by radiant energy in said spectrum portion than other of said semiconductor elements.

9. A radiation detector comprising, in combination, a plurality of radiation sensitive semiconductor elements, means disposed in predetermined position with respect to said plurality of semiconductor elements for producing a magnetic field of preselected characteristics and applying said magnetic field to said plurality of semiconductor elements, movable mounting means mounting said plurality of semiconductor elements and said magnetic field producing means for movement together and providing a movable field of view of predetermined size for all said elements, each of said elements while radiant energy in the infrared portion of the spectrum is impinging thereon and while the magnetic field is applied thereto producing an electrical signal which varies in magnitude with variations in the intensity of the radiant energy impinging thereon and having a polarity in accordance with the instant polarity of the magnetic field applied thereto, electrical circuit means interconnecting said semiconductor elements whereby alternate elements are connected in series in polarity opposition with each other, indicator means operatively connected to said electrical circuit means, and means for moving said mounting means in a predetermined manner, said indicator means being operatively connected to said moving means, said indicator means providing an indication while said field of view is directed at a source of radiant energy of a size such that one of said semiconductor elements is illuminated by infrared radiant energy of greater intensity than the infrared radiant energy intensity on the infrared remainder of said sensitive elements, said indication also providing information as to the location of said source with respect to the location of the radiation detector.

10. Infrared energy detector apparatus comprising, in combination, a plurality of radiation sensitive elements each composed of a semiconductor material, said plurality of radiation sensitive elements being disposed in predetermined positions with respect to each other, means disposed in predetermined position with respect to said plurality of sensitive elements for applying a magnetic field of alternating polarity to at least some of said elements, each of said elements while radiant energy in the infrared portion of the spectrum is impinging thereon and while the magnetic field is applied thereto producing an electrical signal which varies in magnitude with variations in the intensity of the infrared radiant energy impinging thereon and having a polarity which varies in accordance with variations in the polarity of the magnetic field applied thereto, electrical circuit means including means connecting some of the sensitive elements in series in polarity opposition with other of the sensitive elements, and indicating means operatively connected to said electrical circuit means.

11. A space filter comprising, in combination, a plurality of radiation sensitive elements, each of said radiation sensitive elements being constructed of a semiconductor material, said plurality of radiation sensitive elements being disposed in predetermined positions with respect to each other, means disposed in predetermined position with respect to said plurality of radiation sensitive elements for applying a magnetic field to each of said elements, each of said sensitive elements while radiant energy in a predetermined portion of the spectrum is impinging thereon and while the magnetic field is applied thereto producing an electrical signal which varies in magnitude with variations in the intensity of the radiant energy in said spectrum portion impinging thereon and having a polarity in accordance with the polarity of the magnetic field applied thereto, and electrical circuit means connecting some of the sensitive elements in series in polarity opposition with other of the sensitive elements.

12. A space filter comprising, in combination, a plurality of radiation sensitive elements each composed of a semiconductor material, means for focusing radiant energy in the infrared portion of the spectrum arriving from a distant source onto said plurality of elements, said plurality of radiation sensitive elements being disposed in predetermined positions with respect to each other, means disposed in predetermined position with respect to said plurality of sensitive elements for applying a periodically varying magnetic field to at least some of said sensitive elements, each of said elements while infrared radiant energy is impinging thereon and while the magnetic field is applied thereto producing an electrical signal which varies in magnitude with variations in the intensity of the radiant energy impinging thereon and having a polarity in accordance with the instant polarity of the magnetic field applied thereto, and electrical circuit means connecting some of the sensitive elements in series in polarity opposition with other of the sensitive elements.

13. A space filter comprising, in combination, a plurality of semiconductor radiation sensitive elements, each of said radiation sensitive elements having radiant energy in the infrared portion of the spectrum arriving from a distant source impinging thereon, means disposed in predetermined position with respect to said plurality of radiation sensitive elements for applying a magnetic field to each of the elements, each of said sensitive elements while radiant energy in the infrared portion of the spectrum is impinging thereon and while a magnetic field is applied thereto producing an electrical signal which varies in magnitude with variations in the intensity of the infrared radiant energy impinging thereon and having a polarity in accordance with the polarity of the magnetic field applied thereto, said plurality of radiation sensitive elements being disposed in predetermined positions with respect to each other and receiving radiant energy from the same direction, and electrical circuit means connecting alternate sensitive elements in series in polarity opposition.

14. A space filter comprising, in combination, a plurality of radiation sensitive elements each composed of a semiconductor material, said plurality of radiation sensitive elements being arranged in a plurality of substantially parallel rows and substantially parallel files, means disposed in predetermined position with respect to said plurality of sensitive elements for applying a magnetic field of predetermined magnitude and polarity to said plurality of sensitive elements, each of said elements while radiant energy in a predetermined portion of the spectrum is impinging thereon and while the magnetic field is applied thereto generating an electrical signal which varies in magnitude with variations in the intensity of the radiant energy in said spectrum portion impinging thereon and having a polarity in accordance with the polarity of the magnetic field applied thereto, and electrical circuit means interconnecting all of said sensitive elements, adjacent elements in each row being connected in polarity opposition with each other and adjacent elements in each file being connected in polarity opposition with each other.

References Cited in the file of this patent

UNITED STATES PATENTS

| | | |
|---|---|---|
| Re. 23,023 | Wolf et al. | Aug. 3, 1948 |
| 1,834,905 | Sheldon | Dec. 1, 1931 |
| 2,237,713 | Russell | Apr. 8, 1941 |
| 2,392,873 | Zahl | Jan. 15, 1946 |
| 2,403,066 | Evans | July 2, 1946 |
| 2,412,822 | Malter | Dec. 17, 1946 |
| 2,431,625 | Tolson | Nov. 25, 1947 |
| 2,653,185 | Lubcke et al. | Sept. 22, 1953 |
| 2,813,983 | Hammar | Nov. 19, 1957 |

FOREIGN PATENTS

| | | |
|---|---|---|
| 822,388 | France | Dec. 29, 1937 |

OTHER REFERENCES

Physica, vol. XX, No. 11, November 1954, pages 989 to 993. Photo print in IR Digest.

The Photoelectromagnetic Effect in Indium Antimonide, by C. Hilsum et al., Journal of Electronics, vol. 1, No. 2, September 1955, pages 134 to 137.

Photoeffects in InSb, by S. W. Kurnick et al., pages 531 to 538 and Hall Effect and Resistivity Measurements on Photoconductive PBS Films Under Illumination, by Joseph F. Woods, pages 636 to 640, Photoconductivity Conference, published by John Wiley and Sons, Inc., New York.